United States Patent
Gadagkar et al.

(10) Patent No.: US 6,202,112 B1
(45) Date of Patent: Mar. 13, 2001

(54) ARBITRATION METHODS TO AVOID DEADLOCK AND LIVELOCK WHEN PERFORMING TRANSACTIONS ACROSS A BRIDGE

(75) Inventors: Ashish Gadagkar, Sunnyvale; Zohar Bogin; Narendra Khandekar, both of Folsom; David D. Lent, Placerville, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/205,351

(22) Filed: Dec. 3, 1998

(51) Int. Cl.[7] .................................................. G06F 13/42
(52) U.S. Cl. ............................ 710/118; 710/112; 710/129
(58) Field of Search ........................... 710/105, 113–118, 710/112, 119–125, 241, 242, 129; 713/401

(56) References Cited

U.S. PATENT DOCUMENTS

| | | | |
|---|---|---|---|
| 4,796,022 | * | 1/1989 | Schenkel et al. . |
| 4,975,829 | * | 12/1990 | Clarey et al. . |
| 5,278,828 | * | 1/1994 | Chao . |
| 5,535,340 | * | 7/1996 | Bell et al. .............................. 710/112 |
| 5,611,058 | * | 3/1997 | Moore et al. .......................... 710/129 |
| 5,754,802 | * | 5/1998 | Okazawa et al. ..................... 710/129 |
| 5,949,980 | * | 9/1999 | Lee et al. .............................. 710/112 |
| 5,961,623 | * | 10/1999 | James et al. .......................... 710/113 |
| 5,974,465 | * | 10/1999 | Wong ................................... 709/234 |
| 5,999,969 | * | 12/1999 | Holmes et al. ....................... 709/213 |

* cited by examiner

Primary Examiner—Paul R. Myers
(74) Attorney, Agent, or Firm—Blakely, Sokoloff, Taylor & Zafman LLP (57) ABSTRACT

An embodiment of the invention is directed at a bridge having an outbound pipe for buffering transaction information and data being transported from various devices to a bus. The bridge has an arbiter for granting requests associated with these devices to access the outbound pipe for transferring the transaction information and data into the pipe. The bridge generates a reject signal in response to an initial request associated with an initial transaction from a first one of the devices if the outbound pipe is unavailable to accept further transaction information or data. The bridge has response control logic for generating a retry response for the initial transaction in response to the reject signal. The bridge is able to assert a stamp signal in response to the reject signal. The arbiter in response to the stamp being asserted waits, without granting any other lower priority requests to access the outbound pipe, until a subsequent transaction from the first device makes progress.

33 Claims, 7 Drawing Sheets

FIG. 1

(PRIOR ART)

ARBITRATION METHODS TO AVOID DEADLOCK AND LIVELOCK WHEN PERFORMING TRANSACTIONS ACROSS A BRIDGE

BACKGROUND INFORMATION

This invention is generally related to computer systems and more particularly to techniques for avoiding deadlock and livelock when performing bus transactions across a bridge.

Figure 1:
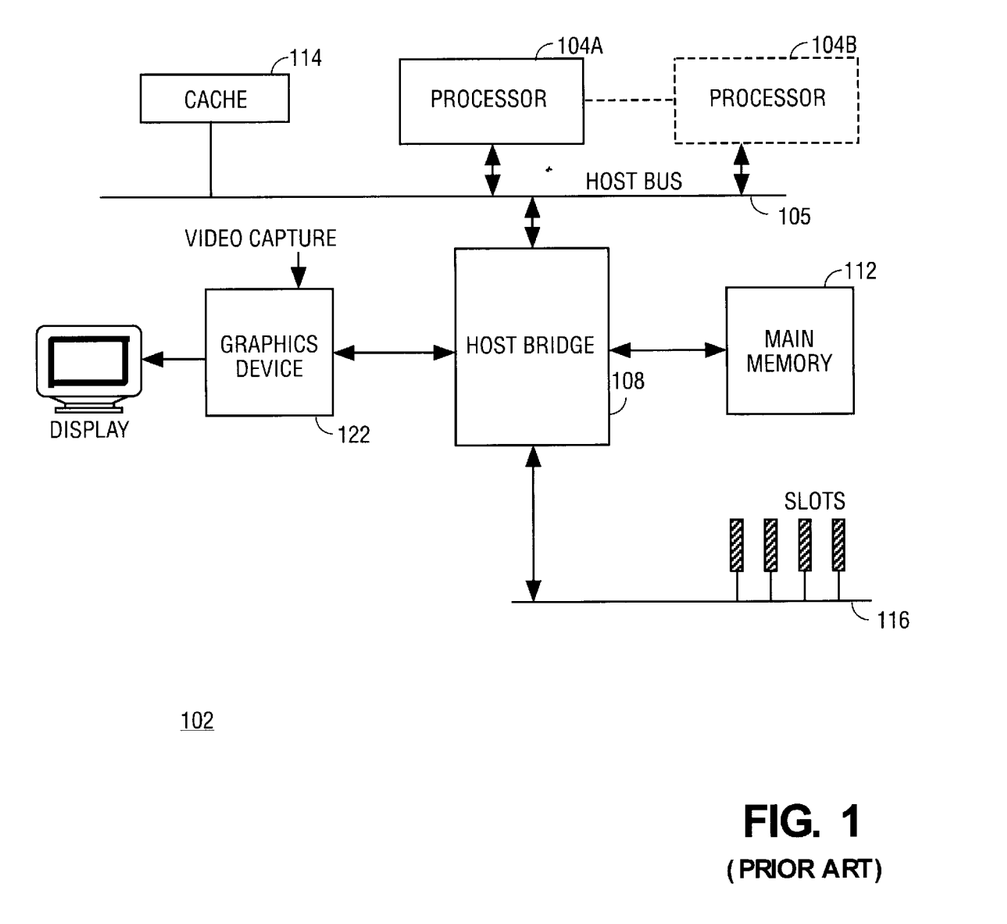
FIG. 1 illustrates a block diagram of a conventional computer system.

Computer systems use a bridge between two buses to allow devices on one bus to communicate with devices on the other bus. FIG. 1 shows such a conventional computer system 102. The system 102 has one or more processors 104 coupled to a host bus 105. The host bus 105 and the processor 104 may be pipelined. A main memory 112 normally comprising Dynamic Random Access Memory (DRAM) is provided for storing programs and data used by the processor 104 and by peripheral devices. The memory 112 can be accessed by the processor 104 and by other devices via a host bridge 108. To speed program execution by minimizing accesses to the memory 112, a cache 114 (which may be internal to the processor 104) is coupled to the host bus 105.

The host bridge 108 also handles transactions between devices on the host bus 105 and those on a system bus 116. The system bus 116 may be one which complies with the currently popular Peripheral Components Interconnect (PCI) Specification, Rev. 2.1, Jun. 1, 1995. A number of slots are provided on the system bus 116 to receive PCI devices such as mass storage controller cards and network interface cards. The host bridge 108 also supports transactions between a graphics device 122 and a device on the system bus 116.

Figure 2:
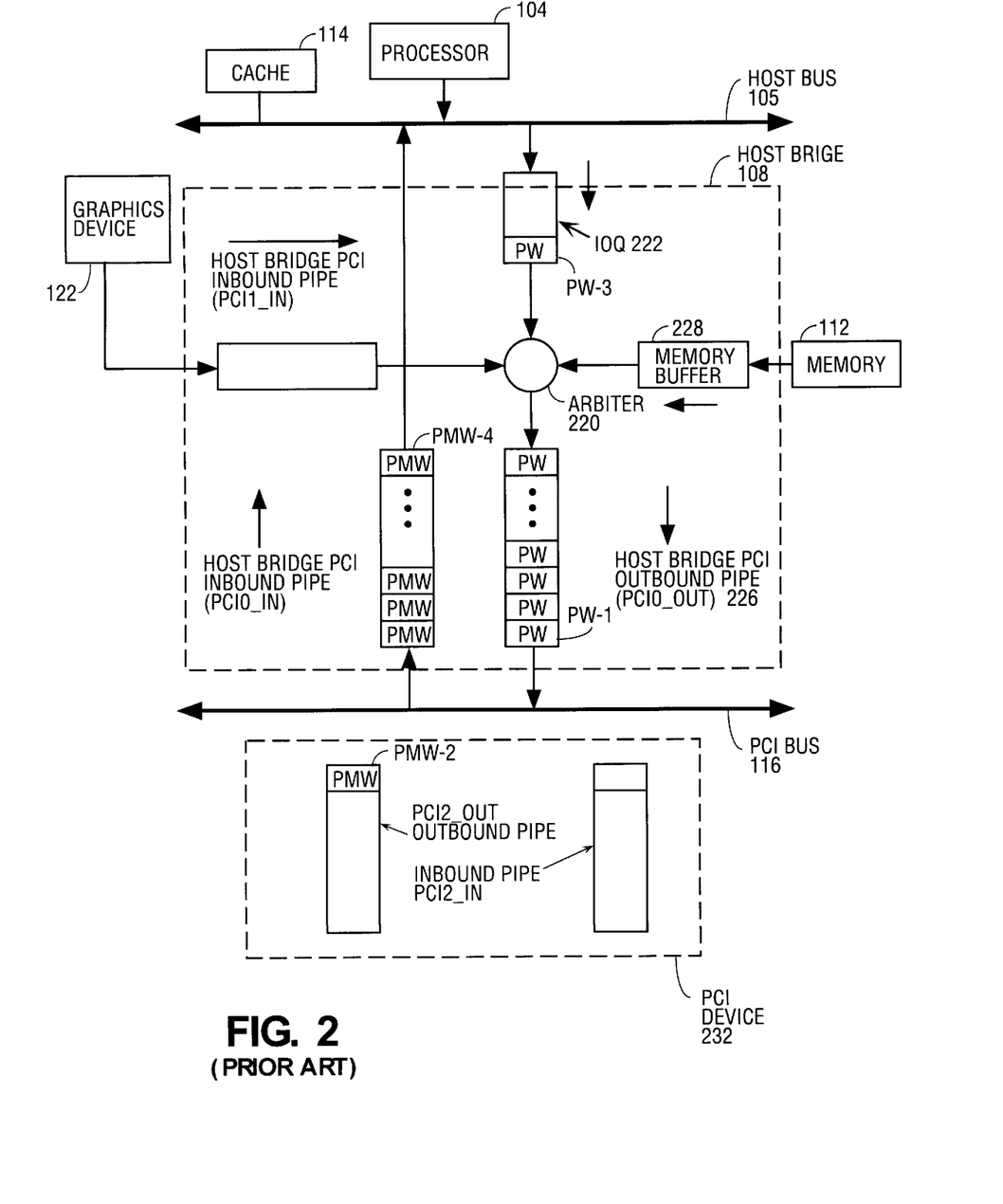
FIG. 2 shows a logical block diagram of the interaction among bus resources leading to a deadlock condition in a conventional computer system.

The PCI-based example in FIG. 2, will be used to demonstrate some problems with the conventional system 102. Read and write transactions across the bridge 108 consist of several access cycles. For instance, posted write transactions involve at least two access cycles. The first cycle is on the initiating side of the bridge (e.g., on the host bus 105) during which a transaction request packet is accepted by the bridge and placed in an in-order queue (IOQ) 222. Thereafter, the first cycle may be completed by transferring the request packet and its associated data to a host bridge PCI outbound pipe 226 (PCI0_OUT) that operates in a first in first out (FIFO) manner. Once the first access cycle is completed, a second access cycle may begin on the system (PCI compliant) bus 116 once the packet reaches the head of PCI0_OUT, to transfer the associated data to a target on the system bus 116. Accesses to the main memory 112 have the additional requirement that the cache 114 be checked for the most recent copy of the data being accessed. For instance, a write to a line in main memory 112 requires invalidating or updating the corresponding line in the cache 114. These data coherency operations require the host bus to be available to check the cache 114.

Modern computer systems operating as network servers or workstations featuring the architecture of FIG. 1 and FIG. 2 are expected to handle a large number of transactions that cross a bridge. When one side of the bridge is subjected to a relatively greater number of transactions than another side, the large number of transactions have the potential to create a deadlock. This is a very serious and usually fatal condition in that the system must normally be shut down if deadlock occurs.

In FIG. 2, deadlock may occur when the cache 114 must be checked as part of an upstream transaction PMW-4 which is at the head of a host bridge PCI inbound pipe (PCI0_IN) which is full. The host bus 105 is not available due to an already pending access cycle for a downstream transaction PW-3. The pending access cycle for PW-3 is stalled and cannot be completed until there is space in PCI0_OUT to accept the transaction request and associated data packets. However, PCI0_OUT has also become full, perhaps because target devices on the PCI bus 116 cannot drain PCI0_OUT as quickly as transactions from the IOQ 222 and a host bridge PCI inbound pipe PCI1_IN are enqueued. This may be because a downstream transaction PW-1 directed at the device 232 on the PCI bus 116 cannot be completed until an upstream memory transaction PMW-2 in the same device has completed. This is an example of an outbound-inbound dependency that certain older peripheral devices such as legacy devices exhibit, where an inbound request cannot be accepted (even though the inbound pipe PCI2_IN is empty) until an existing transaction PMW-2 at the head of its outbound pipe PCI2_OUT has been completed. There are various other situations that pose the inbound/outbound dependency. In all of these situations, since the host bus 105 is not available, PCI0_IN in the bridge 108 cannot be drained and remains full, such that PMW-2 is refused service. Therefore, there is a deadlock as the PW-3 cycle is stuck on the host bus 105 with no data transfer occurring.

One way to avoid the above-described deadlock condition is to reconfigure the peripheral device 232 to eliminate its inbound-outbound dependency to allow PW-1 to proceed before PMW-2 has completed. However, such a technique would require manufacturers to significantly modify current and older peripheral devices, thus substantially increasing the cost of the computer system. Therefore, there is a need for a technique of avoiding deadlocks that does not require expensive modifications in peripheral devices.

SUMMARY

Accordingly, an embodiment of the invention is directed at a bridge having an outbound pipe for buffering transaction information and data being transported from various devices to a bus. The bridge has an arbiter for granting requests associated with these devices to access the outbound pipe for transferring the transaction information and data into the pipe. The bridge generates a reject signal in response to an initial request associated with an initial transaction from a first one of the devices if the outbound pipe is unavailable to accept further transaction information or data. The bridge has response control logic for generating a retry response for the initial transaction in response to the reject signal. The bridge is able to assert a stamp signal in response to the reject signal. The arbiter in response to the stamp being asserted waits, without granting any other requests from devices having lower priority than the first device to access the outbound pipe, until a subsequent transaction from the first device makes progress.

These and other features and advantages of the different embodiments of the invention will be apparent by referring to the drawings, detailed description and claims below.

BRIEF DESCRIPTION OF THE DRAWINGS

FIG. 3 consisting of FIGS. 3A & 3B, shows a portion of a bridge having reject, stamp, and reject counter logic for avoiding deadlock and livelock according to an embodiment of the invention.

DETAILED DESCRIPTION

As briefly summarized above, an embodiment of the invention helps eliminate the occurrence of deadlock and livelock in a computer system having a bridge in which both the inbound and outbound pipes are full and a device on one side of the bridge exhibits inbound/outbound dependency. Referring for example to FIG. 2, the initial transaction may be PW-3 which is signaled a retry. This causes the host bus to become available, so that PMW-4 may proceed, thus draining PCI0_IN. The arbiter's waiting, without granting any other lower priority requests to access the outbound pipe, helps avoid livelock of the retried device by ensuring that the device makes some progress over the host bus instead of being repeatedly retried due to PCI0_IN being filled by the other devices.

Figure 3A:
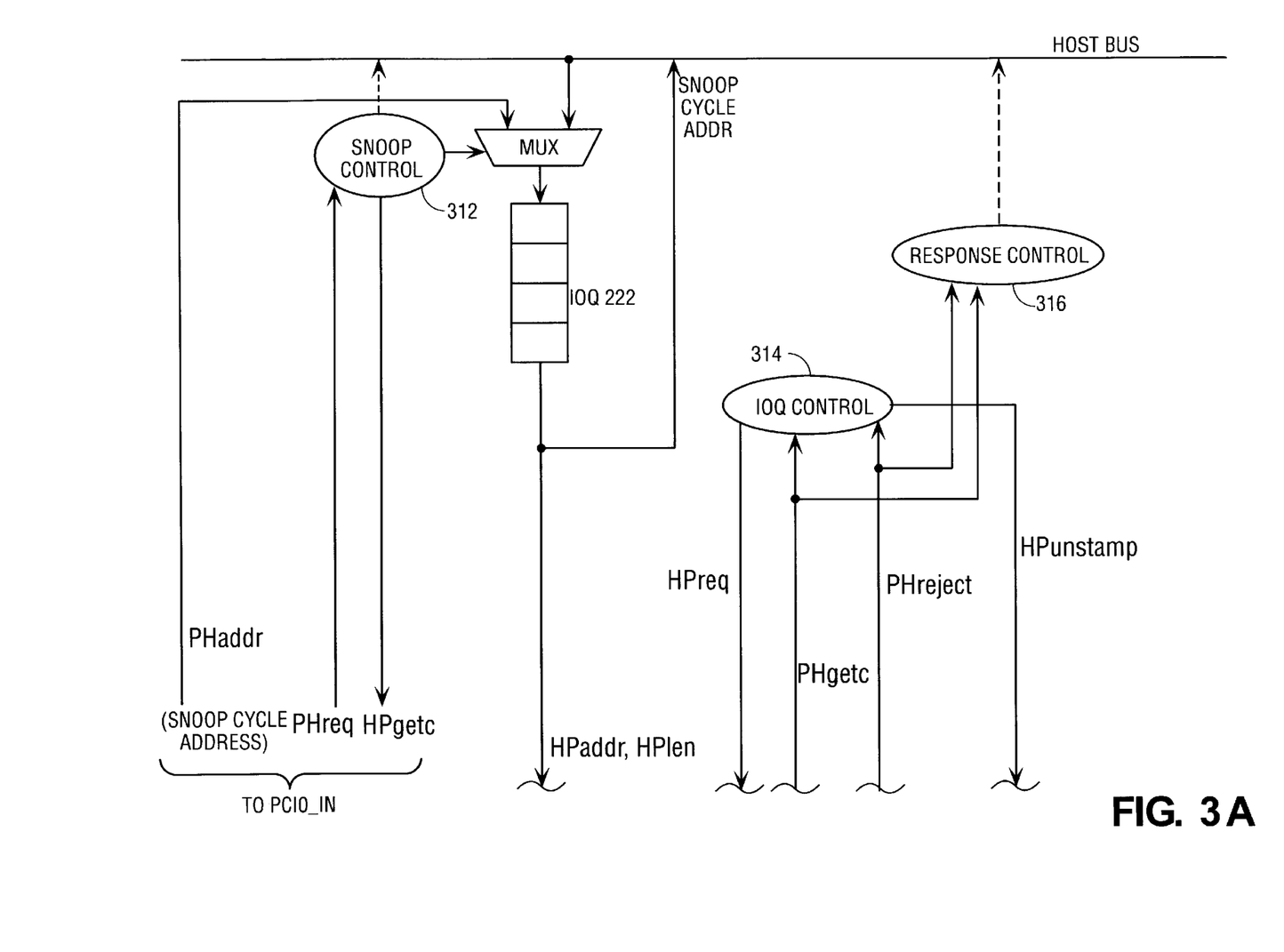
Figure 3B:
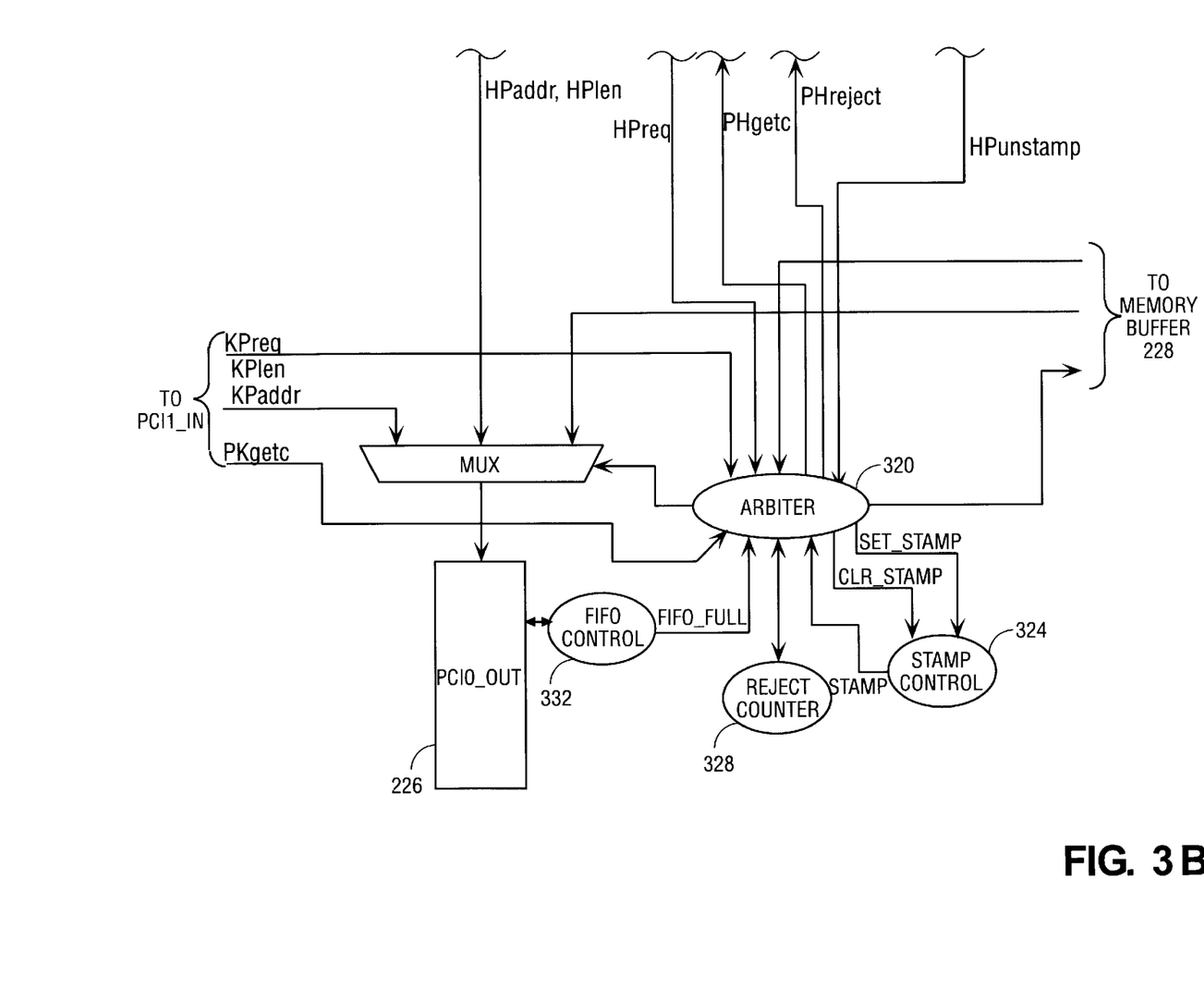

Because the initial transaction will likely be repeated after being retried and may end up behind several other transactions in the IOQ 222, it would be desirable to reduce this latency in performing the initial transaction, particularly if the transaction is part of a PCI burst sequence. This may be done by delaying the retry using the reject counter 328 to allow the outbound pipe PCI0_OUT some time to drain and thus make space for the new IOQ transactions. In many instances, only a relatively small delay is needed to make space in the outbound pipe, such that a performance improvement may be achieved by reducing the latency associated with the immediate retry.

FIG. 3 shows a portion of such a bridge having reject, stamp, and reject counter logic for avoiding deadlock and livelock according to an embodiment of the invention. The FIG. 3 embodiment is based on the PCI-compliant PCI/host bridge 108 of FIG. 2. However, other bridges, including those which are non-PCI compliant, may be so configured. The host bus 105 for this particular embodiment is pipelined such that up to four transactions may be pending in the 4-deep IOQ 222 simultaneously. That, however, is not an essential feature of the invention as deadlock and livelock may still be a problem with non-pipelined buses and with bridges having only a 1-deep queue which is nothing but a transaction buffer. The IOQ 222 receives address and command information (stored as request packets) pertaining to transaction information or data received from either the host bus 105 or from the host bridge PCI inbound pipe PCI0_IN (see FIG. 2). The selection between the two sources is made by snoop control logic 312. The PHaddr received from the PCI0_IN contains a snoop cycle address of a memory write transaction in the inbound pipe PCI0_IN (e.g. posted memory write PMW-4 in FIG. 2) which needs to access the host bus 105 to verify a cache status as part of a write to the memory 112.

The IOQ 222 provides the address (HPaddr) and transaction length information (HPlen) of a transaction at its head to PCI0_OUT. If this transaction involves a snoop of the host bus, then a snoop cycle address is provided to the host bus 105. IOQ control logic 314 is responsible to maintain the IOQ current as transactions are received by and delivered from the IOQ. Also, the IOQ control logic 314 generates a HPreq signal in response to a transaction having moved to the head of the IOQ 222. This transaction may have been requested by the processor 104 or by any other device having access to the host bus. The arbiter 320 may respond by asserting a PHgetc signal if the PCI0_OUT has space to accept the transaction identified by HPaddr and HPlen. If there is insufficient space, then PHreject is asserted by the arbiter logic which causes the transaction at the head of the IOQ 222 to be removed from the IOQ. The logic used to respond to HPreq may, of course, be separated from the arbiter logic. The signals PHgetc and PHreject also cause the response control logic 316 to implement the appropriate response phase of the transaction at the head of the IOQ over the host bus 105. These are normal response (transaction accepted or deferred) for PHgetc, and retry response (transaction rejected) for PHreject.

The arbiter 320 normally provides fair arbitration by giving priority to each of the agents in a round-robin fashion. The agents request access to the outbound pipe PCI0_OUT by asserting their respective request signals. A requesting agent may be granted access using its respective getc signal. The requesting agents in this example are the host bridge PCI inbound pipe PCI1_IN (KPreq and PKgetcx which, for this embodiment, represent a request from and a grant to the graphics device 122, the IOQ 222 (HPreq and PHgetc which represent a request from and grant to the processor), and the memory buffer 228 (BPreq and PBgetc which represent the memory 112 returning data). Other configurations of requesting agents wishing access to the PCI0_OUT may be possible, including for instance one in which there are only two devices and two respective buffers, e.g., one for the processor 104 and one for the graphics device 122.

A reject counter 328 is reset and begins counting when HPreq and FIFO_full are asserted, indicating that a transaction at the head of the IOQ is awaiting access to the outbound pipe PCI0_OUT. The FIFO_full signal is asserted by FIFO control logic 332 when it can no longer accept any further transaction information or data. For instance, FIFO_full may be asserted when PCI0_OUT is filled to capacity. When the counter reaches a predetermined count, the arbiter 320 is notified and various actions will be taken as explained below. The predetermined count may be adjusted, e.g., through a programmable interface (not shown), according to a number of host bus clocks. This may be adjusted to suit different system applications in order to optimize overall performance.

The arbiter 320 generates a set_stamp signal in response to the counter 328 reaching the predetermined count. The arbiter 320 also generates a clr_stamp signal in response to receiving HPunstamp from IOQ control logic 314. HPunstamp is asserted when a transaction involving the processor 104 makes progress over the host bus, i.e., receives a normal or deferred response.

Figure 4:
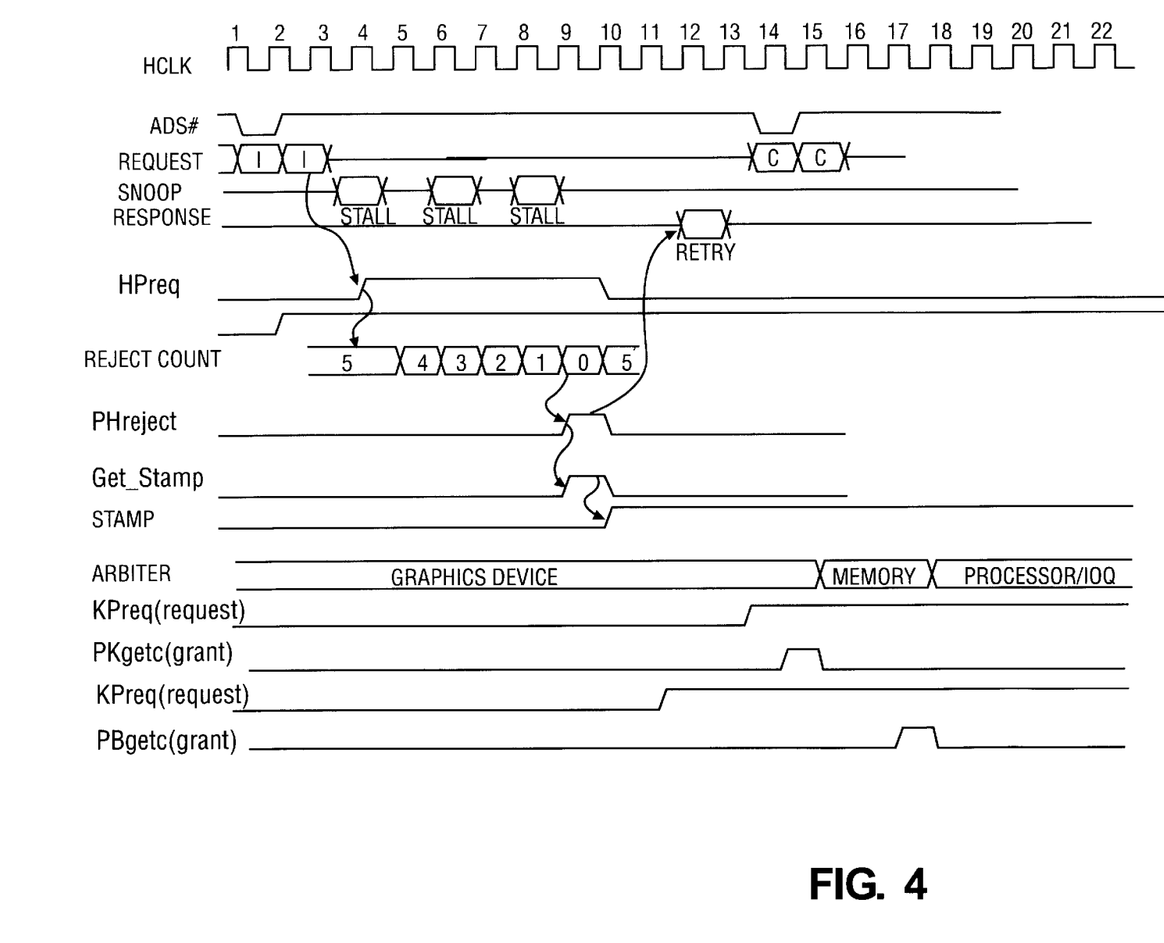
FIG. 4 shows the timing of reject and stamp operations for avoiding deadlock and livelock according to an embodiment of the invention.
Figure 5:
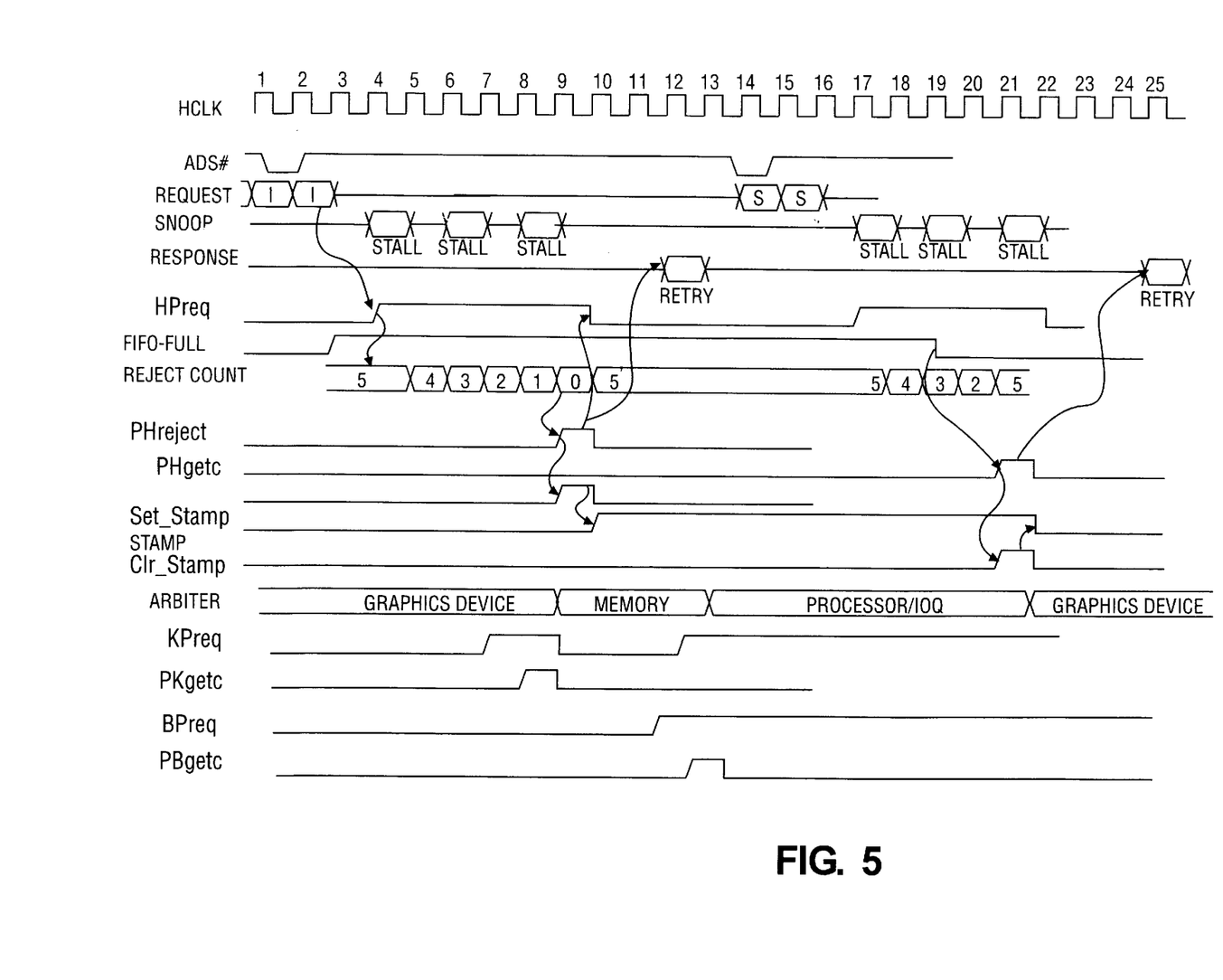
FIG. 5 illustrates a timing diagram showing the effects of the reject and stamp operations according to another embodiment of the invention.
Figure 6:
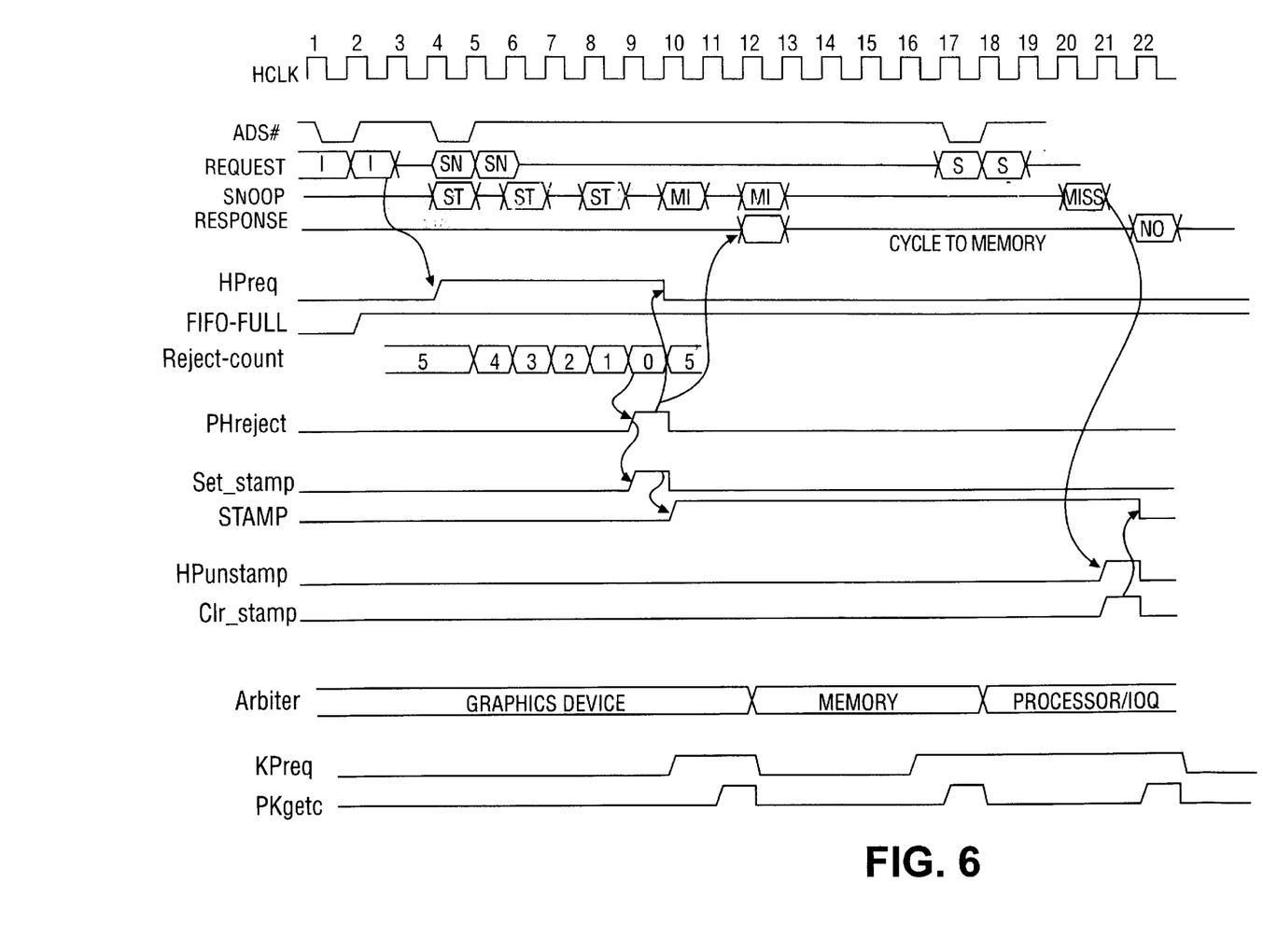
FIG. 6 shows the timing of an unstamp operation according to an embodiment of the invention.

FIG. 4 shows a timing diagram of the reject operation at work according to an embodiment of the invention. FIG. 4 also indicates the agent having the highest arbitration priority for each clock. Upon an arbitration event, the agent with the highest priority as indicated becomes an owner having access to the outbound pipe. Operation begins in the first cycle of the host clock (HCLK) in which the ADS signal is asserted on the host bus 105 by a requesting device, in this case the processor 104. This indicates the beginning of an initial transaction I including a request phase, a snoop phase and a response phase as indicated. The different phases of a typical transaction on the host bus 105 may be according to the description in *Pentium Pro Family Developer's Manual*, Vol. 1: Specifications, Order No. 242690, Intel Corp. (1996). The initial transaction I is directed at the PCI bus 116. The request packets for transaction I are latched into the IOQ 222 upon assertion of HPreq in clock 4. Because the FIFO_full signal is set when HPreq is asserted, the reject count begins in clock 4 and HPgetc is not asserted, due to the outbound pipe being unavailable. The initial transaction is stalled in its snoop phase and continues to be stalled until the reject count reaches 0 in clock 9. At that point, since the FIFO_full signal is still set, PHreject is asserted indicating that the initial request must be signaled a retry response, where the latter occurs later in clock 12. It should be noted that the processor/IOQ need not have higher arbiter priority than the other devices when PHreject is asserted. Preferably, PHreject should be asserted as soon as FIFO_fill is set, HPrequest is set, and the reject count has expired. In addition, the stamp signal is set in response to the initial PHreject in clock 10. This signal will be used to avoid a livelock involving the processor 104 being starved by repeated retries, as will be described in connection with FIG. 5.After the retry response in clock 12, the host bus 105 will be available for other transactions, and particularly PMW-4 as shown in FIG. 2 which needs to access the cache 114 in order to perform a memory write. This in turn allows the PCI0_IN to drain, thus avoiding deadlock.With the graphics device having priority in clock 13, a request that was initiated by the graphics device is represented by the assertion of KPrequest. In response, the arbiter 320 generates PKgetc in the following clock, thus, granting the request. Similarly, a memory request, represented by BPreq being asserted, is granted in clock 17. Note that once the processor/IOQ has priority in clock 18, KPreq and BPreq having lower priority than the processor/IOQ are not granted use of the outbound pipe PCI0_OUT because the stamp signal is asserted while the arbiter priority points to the processor/IOQ. Thus, the arbiter stays in the processor/IOQ priority state and refuses the lower priority requests until HPreq is asserted and FIFO_full is deasserted. In contrast, if the stamp signal were deasserted, then the arbiter may grant requests from devices other than the processor/IOQ, despite the latter having higher priority than those devices. As will be seen below, in another embodiment of the invention, a signal HPunstamp may be used to clear the stamp signal in response to the processor transaction making progress. FIG. 5 shows the timing diagram of signals associated with the reject, reject counter, and stamp mechanisms according to an embodiment of the invention. Operation begins in clock 1 with an initial request I being asserted on the host bus. This causes the assertion of HPreq in clock 4 where the transaction information for the initial request has been latched into the IOQ and a request to access the outbound pipe is issued. The reject count begins in clock 4 because the FIFO_full signal is asserted. If the FIFO_full signal remains asserted when the reject count expires at clock 9, then PHreject is asserted. This latter event eventually leads to a retry response in clock 12 being provided in response to the initial transaction over the host bus. Also, beginning at clock 10, the stamp signal is set.Thereafter, beginning at clock 13, the processor/IOQ has priority for accessing the outbound pipe. However, beginning with clock 12, KPreq has been asserted signifying that the graphics device, and more particularly the PCI1_IN inbound pipe, seeks access to the outbound pipe PCI0_OUT. Since the stamp signal is set, the arbiter does not grant the lower priority KPreq and BPreq while the processor/IOQ has priority (which occurs beginning with clock 13 and up to clock 20). In clock 14, a subsequent transaction is initiated on the host bus by the processor 104. This leads to the HPreq signal to be asserted in clock 17. Since FIFO_full is set when HPreq is asserted, the reject counter is reset in clock 17 and begins to run its predetermined count. However, before the reject counter reaches the predetermined count, the outbound pipe PCI0_OUT becomes available in clock 19, represented by FIFO_full being deasserted, which leads to the assertion of PHgetc. The assertion of PHgetc signifies that the associated transaction may be accepted into PCI0_OUT, and eventually a normal response may be signaled on the host bus. This latter event eventually occurs, in this embodiment, in clock 24. In addition, the assertion of PHgetc also causes the stamp signal to be cleared. With the stamp signal now clear, the next time the processor/IOQ obtains priority, other lower priority requests such as KPreq and BPreq may be granted access to the PCI0_OUT.FIG. 6 illustrates the timing of signals associated with the clearing of the stamp signal according to another embodiment of the invention. Operation in FIG. 6 corresponding to clocks 1–12 is essentially identical to the same time frame discussed above in connection with FIG. 5. However, there are no subsequent requests by the processor to access the outbound pipe PCI0_OUT following the retry response in clock 12. Instead, ADS# is asserted in clock 17 indicating that the subsequent transaction issued on the host bus is a processor cycle to the memory 112 (see FIG. 2 momentarily). Thereafter, the transaction enters its snoop phase where a miss is declared and eventually in clock 22 a normal response is signaled on the host bus, indicating a successful completion of the subsequent transaction. Note that the stamp signal was set earlier in clock 10 and remained set throughout the subsequent transaction. Accordingly, in clocks 18–21 in which the processor/IOQ has priority, the KPreq associated with the graphics device is not granted because of the stamp being set. In clock 21, however, the IOQ control logic 314 detects the subsequent transaction making progress, and in response asserts the HPunstamp signal in clock 21. The processor making progress is indicated by a cycle from processor to memory being completed, a cycle from processor to the graphics device being completed, or a cycle from the processor being deferred. HPunstamp in turn instructs the arbiter 320 to generate a clear stamp pulse that eventually leads to the clearing of the stamp signal in clock 22. With the stamp being cleared, other agents which have lower priority than the IOQ in clock 22 may be granted access to the outbound pipe PCI0_IN as shown by PKgetc being asserted in clock 22. To summarize, various techniques for avoiding deadlock and livelock while making optimal use of the pipes in a bridge have been described. The embodiments of the invention described above are, of course, subject to some variations in structure and implementation. Although the techniques were illustrated using a host bridge that complies with the PCI specification, one of ordinary skill in the art will recognize that the invention may be practiced in other settings as well, including other bus specifications and bridge devices that present a deadlock and livelock problem. Therefore, the scope of the invention should be determined not by the embodiments illustrated but by the appended claims and their legal equivalents.

What is claimed is:
1. A bridge comprising:
   outbound pipe for buffering transaction information and data being transported from a plurality of devices to a bus;
   arbiter for granting requests associated with said devices to access the outbound pipe for transferring said transaction information and data into the pipe;
   means for generating a reject signal in response to an initial request associated with an initial transaction from a first one of said devices if the outbound pipe is unavailable to accept further transaction information or data;
   response control logic for generating a retry response for the initial transaction in response to the reject signal; and means for asserting a stamp signal in response to the reject signal, the arbiter in response to the stamp being asserted waits, without granting any other requests from devices having lower priority than the first device to access the outbound pipe, until a subsequent transaction from the first device makes progress, and wherein the reject signal is generated only if a first predetermined time has lapsed since the initial request.

2. The bridge of claim 1 wherein the arbiter grants a request associated with a device other than the first device and having lower priority than the first device when the stamp signal is deasserted.

3. The bridge of claim 1 wherein the reject signal is generated regardless of which device has higher priority.

4. The bridge of claim 1 further comprising means for generating a subsequent reject signal in response to a subsequent request associated with the subsequent transaction if the outbound pipe does not become available before the end of a second predetermined time since the subsequent request.

5. The bridge of claim 1 further comprising means for generating a normal response associated with the subsequent transaction if the subsequent transaction completes.

6. The bridge of claim 1 wherein the outbound pipe is unavailable to accept further transaction information and data because it is filled to capacity.

7. The bridge of claim 1 further comprising means for clearing the stamp signal in response to a transaction involving said first device being completed.

8. A bridge for transporting transaction information and transaction data from a plurality of devices, including a processor, to a bus, comprising:

outbound pipe coupled between the devices and the bus for buffering said transaction information and data;

arbiter logic for granting requests by said devices to access the outbound pipe for transporting said transaction information and data to the bus, the arbiter logic generating a reject signal in response to an initial request associated with an initial transaction from the processor if the outbound pipe is unavailable to accept further transaction information or data;

means for generating a retry response for the initial transaction in response to the reject signal, the arbiter logic asserts a stamp signal in response to the reject signal, the arbiter grants a request associated with a device having lower priority than the processor when the stamp signal is deasserted, the arbiter logic in response to the stamp being asserted waits, without granting any other requests from devices having lower priority than the processor to access the outbound pipe, for a subsequent transaction from the processor to make progress before granting the other requests, and wherein the reject signal is generated only if a first predetermined time has lapsed since the initial request.

9. The bridge of claim 8 wherein the arbiter logic further generates a subsequent reject signal in response to a subsequent request associated with the subsequent transaction if the outbound pipe does not become available before the end of a second predetermined time since the subsequent request.

10. The bridge of claim 9 wherein the arbiter grants said subsequent request if the outbound pipe becomes available before the end of the predetermined time, the bridge further generates a normal response to the subsequent request if the subsequent transaction completes.

11. The bridge of claim 8 wherein the arbiter logic clears the stamp signal in response to a processor transaction being completed.

12. A computer system comprising:

first bus;

second bus;

first device coupled to the first bus for issuing transactions directed at the second bus;

second device for issuing transactions directed at the second bus;

transfer logic coupled between the first bus, the second device, and the second bus, the transfer logic comprising:

outbound pipe having an input coupled to the first bus and the second device and an output coupled to the second bus for holding transaction information and data directed at the second bus, the first and second device for issuing arbitration requests to access the outbound pipe, the transfer logic signals a retry response associated with an initial request for an initial transaction from the first device if the outbound pipe is unavailable to accept further transaction information or data, and while the first device is not requesting access and the outbound pipe is unavailable, the second device having lower priority than the first device requests access but the transfer logic does not grant said access, the first device issues a transaction on the first bus, and then the transfer logic waits, without granting access to the second device, until the transaction makes progress before granting the second device access to the pipe, and wherein the reject signal is generated only if a first predetermined time has lapsed since the initial request.

13. The system of claim 12 further comprising memory coupled to the transfer logic for issuing return data directed at the second bus, the input of the outbound pipe being further coupled to the memory, the memory for issuing arbitration requests to access the outbound pipe.

14. The system of claim 12 wherein the first device comprises a processor, and the second device comprises a graphics controller.

15. The system of claim 13 further comprising cache coupled to the first bus; and the transfer logic further comprising inbound pipe for buffering transactions from the second bus to the first bus and to the memory, the inbound pipe issuing a memory transaction that accesses the cache via the first bus after the retry response to the initial request has freed the host bus.

16. The system of claim 13 further comprising third device coupled to the second bus, the third device having an inbound/outbound dependency.

17. The system of claim 16 wherein the dependency prevents completion of an inbound transaction issued from a head of the outbound pipe, the inbound transaction targeting the third device, prior to completion of an outbound transaction issued by the third device and targeting the inbound pipe.

18. A bridge comprising:

outbound pipe for buffering transaction information and data being transported from a plurality of devices to a bus;

arbiter for granting requests associated with said devices to access the outbound pipe for transferring said transaction information and data into the pipe;

means for generating a reject signal in response to an initial request associated with an initial transaction from a first one of said devices if the outbound pipe is unavailable to accept further transaction information or data;

response control logic for generating a retry response for the initial transaction in response to the reject signal; and means for asserting a stamp signal in response to the reject signal, the arbiter in response to the stamp being asserted waits, without granting any other requests from devices having lower priority than the first device to access the outbound pipe, until a subsequent transaction from the first device makes progress, and wherein the arbiter grants a request associated with a device other than the first device and having lower priority than the first device when the stamp signal is deasserted.

19. The bridge of claim 18 wherein the reject signal is generated regardless of which device has higher priority.

20. The bridge of claim 18 wherein the reject signal is generated only if a first predetermined time has lapsed since the initial request.

21. The bridge of claim 18 further comprising means for generating a subsequent reject signal in response to a subsequent request associated with the subsequent transaction if the outbound pipe does not become available before the end of a second predetermined time since the subsequent request.

22. The bridge of claim 18 further comprising means for clearing the stamp signal in response to a transaction involving said first device being completed.

23. A bridge for transporting transaction information and transaction data from a plurality of devices, including a processor, to a bus, comprising:

outbound pipe coupled between the devices and the bus to buffer said transaction information and data;

arbiter logic to grant requests by said devices to access the outbound pipe, the arbiter logic to generate a reject signal in response to an initial request associated with an initial transaction from the processor if the outbound pipe is unavailable to accept further transaction information or data;

means for generating a retry response for the initial transaction in response to the reject signal, the arbiter logic to assert a stamp signal in response to the reject signal, the arbiter to grant a request associated with a device having lower priority than the processor when the stamp signal is deasserted, the arbiter logic to wait, in response to the stamp being asserted, without granting any other requests from devices having lower priority than the processor to access the outbound pipe, for a subsequent transaction from the processor to make progress before granting the other requests.

24. The bridge of claim 23 wherein the arbiter logic is to further generate a subsequent reject signal in response to a subsequent request associated with the subsequent transaction if the outbound pipe does not become available before the end of a second predetermined time since the subsequent request.

25. The bridge of claim 24 wherein the arbiter is to grant said subsequent request if the outbound pipe becomes available before the end of the predetermined time, the bridge is to further generate a normal response to the subsequent request if the subsequent transaction completes.

26. The bridge of claim 23 wherein the arbiter logic is to clear the stamp signal in response to a processor transaction being completed.

27. The bridge of claim 23 wherein the arbiter logic is to generate the reject signal only if a predetermined time has lapsed since the initial request.

28. A computer system comprising:

a first bus;

a second bus;

a first device coupled to the first bus to issue transactions directed to the second bus;

a second device to issue transactions directed to the second bus;

transfer logic coupled between the first bus, the second device, and the second bus, the transfer logic comprising:

an outbound pipe having an input coupled to the first bus and the second device and an output coupled to the second bus, to hold transaction information and data directed to the second bus, the first and second device to issue arbitration requests to access the outbound pipe, the transfer logic to signal a retry response associated with an initial request for an initial transaction from the first device if the outbound pipe is unavailable to accept further transaction information or data, and while the first device is not requesting access and the outbound pipe is unavailable and the second device has lower priority than the first device, the transfer logic to grant the second device access if a stamp signal is deasserted and deny said access if the stamp signal is asserted.

29. The system of claim 28 further comprising memory coupled to the transfer logic to issue return data directed to the second bus, the input of the outbound pipe being further coupled to the memory, the memory to issue arbitration requests to access the outbound pipe.

30. The system of claim 29 further comprising cache coupled to the first bus; and the transfer logic further comprising inbound pipe to buffer transactions from the second bus to the first bus and to the memory, the inbound pipe to issue a memory transaction that accesses the cache via the first bus after the retry response to the initial request has freed the host bus.

31. The system of claim 28 wherein the retry response is generated only if a first predetermined time has lapsed since the initial request.

32. The system of claim 28 further comprising a third device coupled to the second bus, the third device having an inbound/outbound dependency.

33. The system of claim 32 wherein the dependency prevents completion of an inbound transaction issued from a head of the outbound pipe, the inbound transaction targeting the third device, prior to completion of an outbound transaction issued by the third device and targeting the inbound pipe.

* * * * *